US012638671B2

(12) United States Patent
Ueyama et al.

(10) Patent No.:  US 12,638,671 B2
(45) Date of Patent:      May 26, 2026

(54) COLOR WHEEL UNIT, LIGHT SOURCE DEVICE, AND PROJECTION DISPLAY APPARATUS

(71) Applicant: Panasonic Intellectual Property Management Co., Ltd., Osaka (JP)

(72) Inventors: Kohei Ueyama, Osaka (JP); Shuichiro Yamada, Osaka (JP)

(73) Assignee: PANASONIC PROJECTOR & DISPLAY CORPORATION, Osaka (JP)

( * ) Notice: Subject to any disclaimer, the term of this patent is extended or adjusted under 35 U.S.C. 154(b) by 730 days.

(21) Appl. No.: 17/956,047

(22) Filed: Sep. 29, 2022

(65) Prior Publication Data

US 2023/0118868 A1      Apr. 20, 2023

(30) Foreign Application Priority Data

Oct. 18, 2021    (JP) ................................. 2021-170315

(51) Int. Cl.
*G02B 26/00*         (2006.01)
*G03B 21/20*         (2006.01)
*G03B 21/54*         (2006.01)

(52) U.S. Cl.
CPC ......... *G02B 26/008* (2013.01); *G03B 21/204* (2013.01); *G03B 21/54* (2013.01)

(58) Field of Classification Search
None
See application file for complete search history.

(56) References Cited

U.S. PATENT DOCUMENTS

| 6,769,776 | B1 | 8/2004 | Chen et al. | |
| 2005/0248690 | A1* | 11/2005 | Kim ..................... | G02B 26/008 |
| | | | | 348/743 |
| 2016/0360166 | A1 | 12/2016 | Ogawa | |
| 2017/0269462 | A1 | 9/2017 | Maeda | |
| 2017/0357150 | A1 | 12/2017 | Ueda | |

FOREIGN PATENT DOCUMENTS

| JP | 3099869 | 4/2004 |
| JP | 2005-352187 | 12/2005 |
| JP | 2017-3643 | 1/2017 |
| JP | 2017-167528 | 9/2017 |
| JP | 2017-219747 | 12/2017 |

* cited by examiner

*Primary Examiner* — Shan Liu
(74) *Attorney, Agent, or Firm* — Wenderoth, Lind & Ponack, L.L.P.

(57)      ABSTRACT

A color wheel unit includes a color wheel assembly, a rod integrator, and a holder. The holder includes a first base configured to be attached to a housing of a projection display apparatus, a second base protruding from the first base, and a third base protruding from the second base and to which the rod integrator is attached. The third base includes a first guide wall and a second guide wall configured to guide the color wheel assembly. The color wheel assembly includes a color wheel, a motor configured to rotationally drive the color wheel, and a support part configured to rotatably support the color wheel. The support part includes a first restricting part configured to have a movement thereof restricted and guided by the first guide wall, and a second restricting part configured to have a movement thereof restricted and guided by the second guide wall.

8 Claims, 16 Drawing Sheets

Inside

Outside

23

Y  X

Z 87    73a 71    73    72

24

Spectral Change in Green Light

COLOR WHEEL UNIT, LIGHT SOURCE DEVICE, AND PROJECTION DISPLAY APPARATUS

BACKGROUND

1. Technical Field

The present invention relates to a color wheel unit, a light source device, and a projection display apparatus.

2. Description of the Related Art

Conventionally, in order to align a color wheel and a rod integrator, a color wheel unit in which the color wheel and the rod integrator are integrated has been proposed.

For example, Japanese Utility Model No. 3099869 has devised a color wheel assembly in which a color wheel and a light guide are integrated.

Further, Unexamined Japanese Patent Publication No. 2017-167528 has proposed a light source device in which a dichroic film that reflects blue light is disposed on a color wheel to cut the blue light.

SUMMARY

However, when the color wheel and the rod integrator as a light guide are assembled, the color wheel and the rod integrator may be brought into contact with each other and damaged.

An object of the present disclosure is to provide a color wheel unit, a light source device, and a projection display apparatus in which assemblability between a color wheel and a rod integrator is improved.

A color wheel unit according to the present disclosure includes a color wheel assembly having a color wheel, a rod integrator where light having passed through the color wheel is incident, and a holder to which the color wheel assembly and the rod integrator are attached. The holder includes a first base attached to a housing of a projection display apparatus, a second base protruding from the first base, and a third base further protruding from the second base and to which the rod integrator is attached. The third base includes a first guide wall and a second guide wall that guide the color wheel assembly when the color wheel assembly is attached to the holder. The color wheel assembly includes a motor that is coupled to the color wheel and rotationally drives the color wheel, and a support part that rotatably supports the color wheel. The support part includes a first restricting part whose movement is restricted and guided by the first guide wall, and a second restricting part whose movement is restricted and guided by the second guide wall when the color wheel assembly is attached to the holder.

The present disclosure can provide a color wheel unit, a light source device, and a projection display apparatus in which assemblability between a color wheel and a rod integrator is improved.

BRIEF DESCRIPTION OF THE DRAWINGS

FIG. 2 is an outer appearance perspective view of a color wheel unit;

DETAILED DESCRIPTION

Exemplary embodiments will be described in detail below with reference to the drawings as appropriate. However, unnecessarily detailed description may be omitted. For example, the detailed description of already well-known matters and the overlap description of substantially same configurations may be omitted. This is to avoid an unnecessarily redundant description below and to facilitate understanding by those skilled in the art.

Note that, the accompanying drawings and the following description are provided for those skilled in the art to fully understand the present disclosure, and are not intended to limit the subject matter described in the claims.

First Exemplary Embodiment

1-1. Configuration of Projection Display Apparatus

Figure 1:
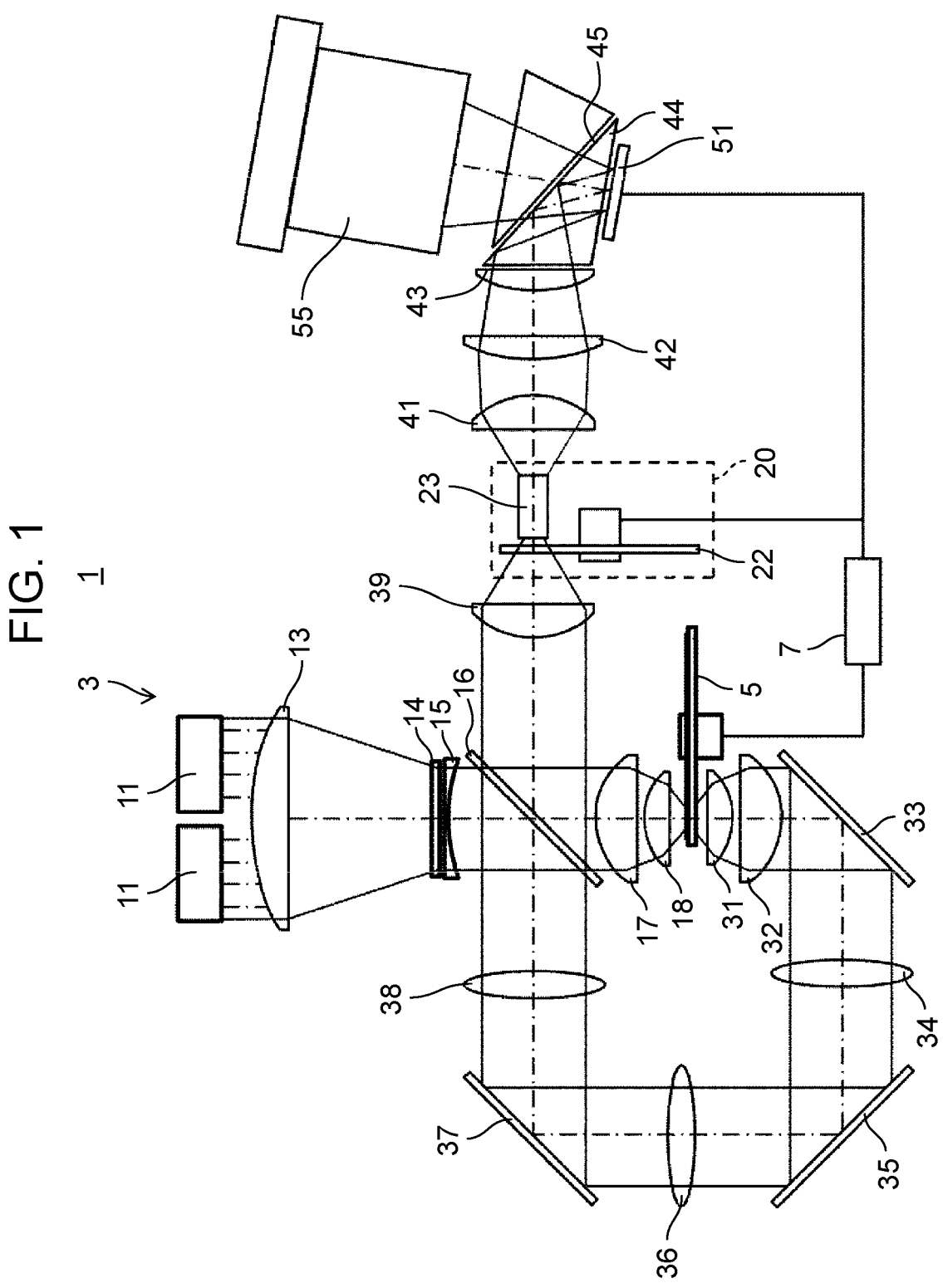
FIG. 1 is a diagram illustrating a configuration of a projection display apparatus according to a first exemplary embodiment.

Projection display apparatus 1 according to a first exemplary embodiment will be described with reference to FIG. 1. FIG. 1 is a diagram illustrating a configuration of projection display apparatus 1 according to the first exemplary embodiment.

As illustrated in FIG. 1, light source device 3 of the first exemplary embodiment is, for example, a light source device for a one-chip DMD type projection display apparatus using one digital micromirror device (DMD). Light source device 3 includes laser light sources 11, phosphor wheel 5, color wheel unit 20, and controller 7. Laser light in a blue wavelength region emitted from the plurality of laser light sources 11 is collimated by a plurality of collimator lenses (not illustrated) provided corresponding to laser light sources 11. The collimated blue light is incident on convex lens 13 in a subsequent stage, a light flux width thereof is reduced, and the blue light is incident on subsequent diffuser plate 14 and diffused, so that uniformity of the light is improved. The blue light having improved uniformity of light is incident on concave lens 15 in the subsequent stage and is converted into parallel light flux.

The blue light collimated by concave lens 15 enters selective reflection element 16 disposed at an angle of approximately 45 degrees with respect to an optical axis, travels straight, and enters convex lens 17. Selective reflection element 16 has a spectral characteristic of reflecting light in a wavelength range of fluorescent light that passes light in a wavelength range of blue light emitted from laser light sources 11 and is wavelength-converted by phosphor wheel 5 using the blue light from laser light sources 11 as excitation light. Selective reflection element 16 is, for example, a dichroic mirror.

The blue light incident on convex lens 17 is incident on wavelength conversion element 92 or passing region 93 disposed in an annular region on substrate 91 of phosphor wheel 5 (see FIG. 10) at the subsequent stage in combination with convex lens 18 at the subsequent stage. Phosphor wheel 5 is disposed such that the blue excitation light condensed by convex lenses 17, 18 is incident on annular wavelength conversion element 92 or passing region 93 around a rotation shaft of the phosphor wheel. Phosphor wheel 5 is provided with a sensor (not illustrated) that detects a rotation phase of a motor that rotationally drives phosphor wheel 5. A detection signal detected by this sensor is transmitted to controller 7.

As illustrated in FIG. 1, the blue light condensed on wavelength conversion element 92 of phosphor wheel 5 by convex lenses 17, 18 is wavelength-converted into fluorescent light, and is incident on convex lenses 18, 17 again in this order to be collimated after a traveling direction of the light is changed by 180 degrees. The fluorescent light subjected to wavelength conversion here is, for example, green light and yellow light.

The collimated fluorescent light emitted from convex lens 17 is incident on selective reflection element 16 again. As described above, since selective reflection element 16 has a characteristic of reflecting the light in the fluorescent light wavelength region, a direction of the light in the fluorescent light wavelength region is changed by 90 degrees and made incident on the convex lens 39.

Next, the blue light from laser light sources 11 condensed on passing region 93 of phosphor wheel 5 passes through phosphor wheel 5, and is collimated by convex lenses 31, 32 at the subsequent stage. Thereafter, light is guided to selective reflection element 16 by a relay lens system including three reflection mirrors 33, 35, 37 and three convex lenses 34, 36, 38 provided at the subsequent stage such that light is collimated from a direction at which light from laser light sources 11 is incident from a direction at an angle of 90 degrees with respect to the direction. Note that, here, the relay optical system includes three mirrors and three convex lenses, but other configurations may be used as long as they have similar performance.

The blue light incident on selective reflection element 16 from convex lens 38 passes through selective reflection element 16 and travels straight.

With the above configuration, the fluorescent light and blue light are time-divided and incident on convex lens 39.

The time-divided fluorescent light and blue light incident on convex lens 39 from selective reflection element 16 are condensed by convex lens 39 and incident on color wheel 22 of color wheel unit 20 in the subsequent stage. Color wheel 22 is controlled by controller 7 to rotate synchronously with phosphor wheel 5, and a plurality of filters having a characteristic of transmitting a part or the entire wavelength range of blue light and fluorescent light are attached in accordance with a characteristic of the optical system. Controller 7 can be implemented by a semiconductor element or the like. Controller 7 may be configured with, for example, a microcomputer, a central processing unit (CPU), a microprocessor unit (MPU), a graphics processor unit (GPU), a digital signal processor (DSP), a field-programmable gate array (FPGA), or an application specific integrated circuit (ASIC). Controller 7 reads data and programs stored in a built-in storage unit (not illustrated) and performs various arithmetic processing, thereby implementing a predetermined function. The storage unit can be implemented by, for example, a hard disk (HDD), a solid state drive (SSD), a random access memory (RAM), a dynamic random access memory (DRAM), a ferroelectric memory, a flash memory, a magnetic disk, or a combination thereof.

For example, with respect to a time zone in which yellow fluorescent light is emitted from phosphor wheel 5, color wheel 22 having at least one region among a region in which the wavelength region of the fluorescent light is transmitted as it is, a region in which light of a red part in the fluorescent light is reflected and green light is transmitted, a region in which light of a green part in the fluorescent light is reflected and red light is transmitted, and the like rotates in synchronization. Further, since the region of color wheel 22 that transmits the wavelength region of the blue light as it is corresponds to the blue light having passed through the passing region of phosphor wheel 5, color lights having different wavelength regions of light are condensed in time series in the vicinity of an incident end of rod integrator 23.

The light incident on rod integrator 23 of color wheel unit 20 is uniformed by rod integrator 23, and the uniformed light is emitted from an emission end thereof.

Note that in the first exemplary embodiment, color wheel 22 is disposed in front of rod integrator 23, but may be disposed behind rod integrator 23.

As illustrated in FIG. 1, projection display apparatus 1 of the first exemplary embodiment is, for example, a so-called one-chip type DMD projector using one DMD. Projection display apparatus 1 includes light source device 3.

The light emitted from rod integrator 23 is mapped to DMD 51 described later by a relay lens system including convex lenses 41, 42, 43.

The light that has passed through convex lenses 41, 42, 43 and entered total reflection prism 44 enters minute gap 45 of total reflection prism 44 at an angle larger than or equal to a total reflection angle, and is reflected to change the traveling direction of the light and enter DMD 51.

DMD 51 changes a direction of a micromirror according to a signal from an image circuit (not illustrated) synchronized with the color light emitted by the combination of phosphor wheel 5 and color wheel 22, and emits the light while changing the traveling direction of the light.

The light whose traveling direction is changed by DMD 51 according to the image signal is incident on total reflection prism 44, incident on minute gap 45 of total reflection prism 44 at an angle less than or equal to the total reflection angle, transmitted as it is, incident on projection lens unit 55, and projected on a screen (not illustrated).

1-2. Configuration of Color Wheel Unit

Figure 2:
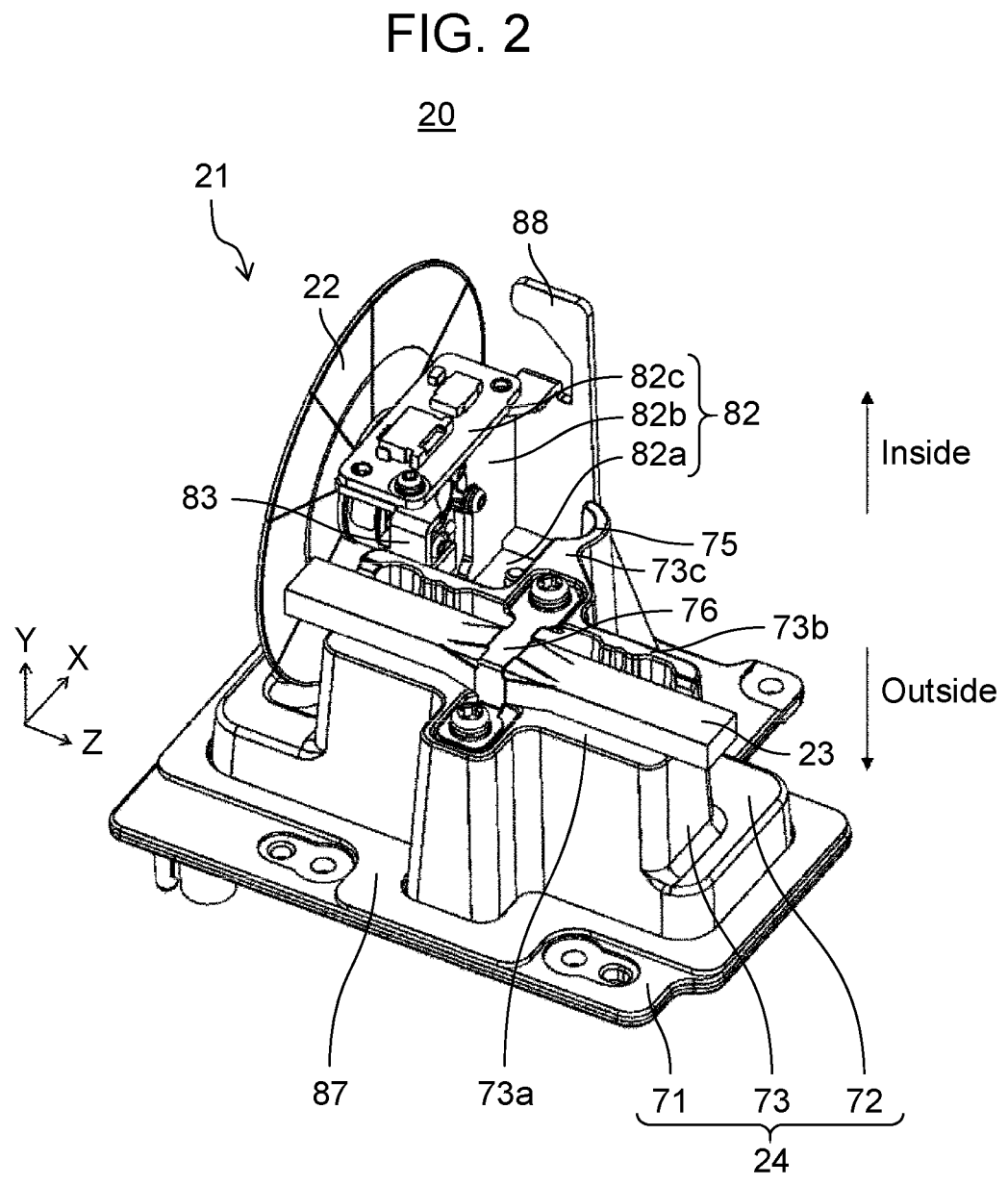
Figure 3:
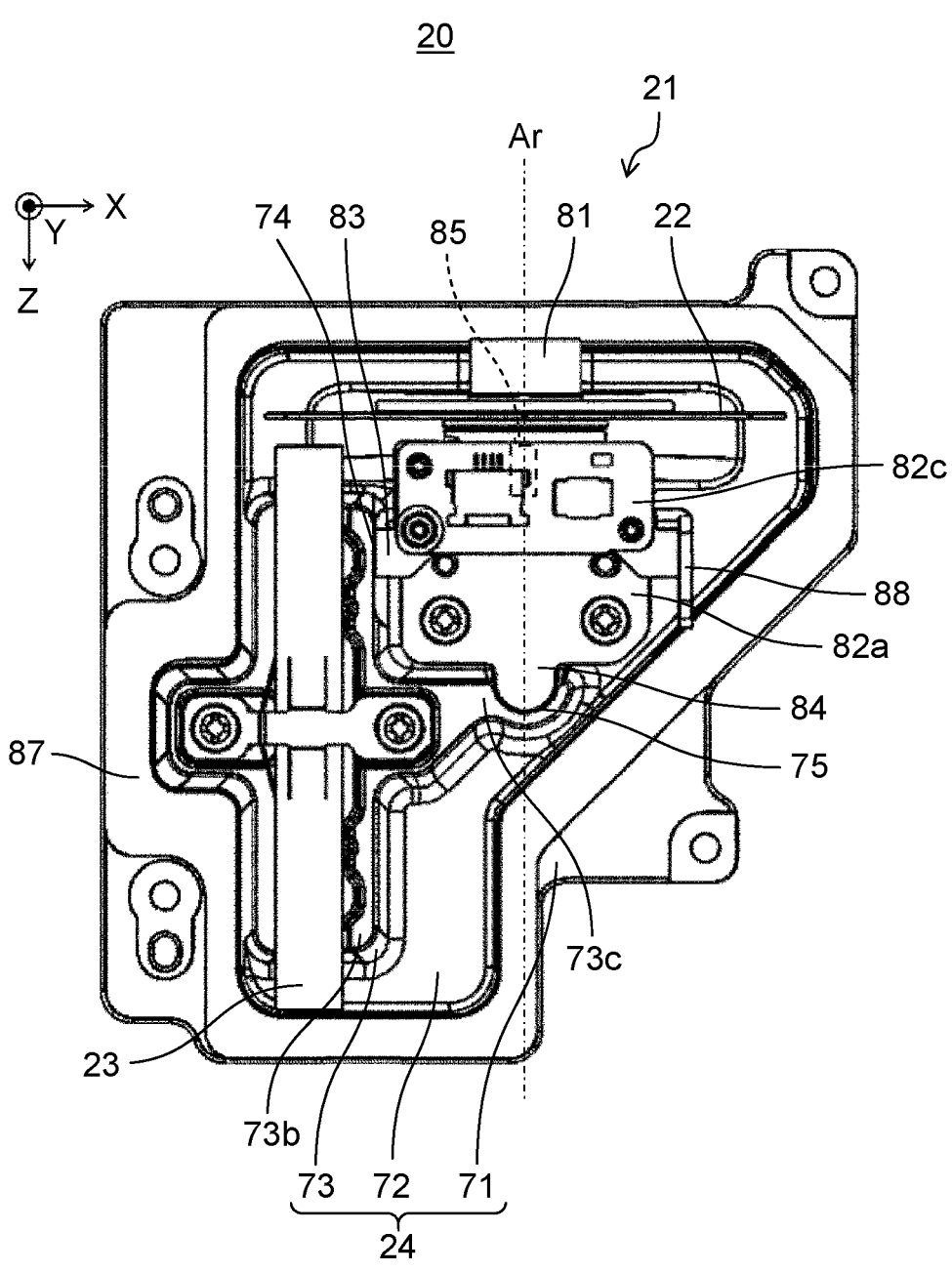
FIG. 3 is a bottom view of the color wheel unit.
Figure 4:
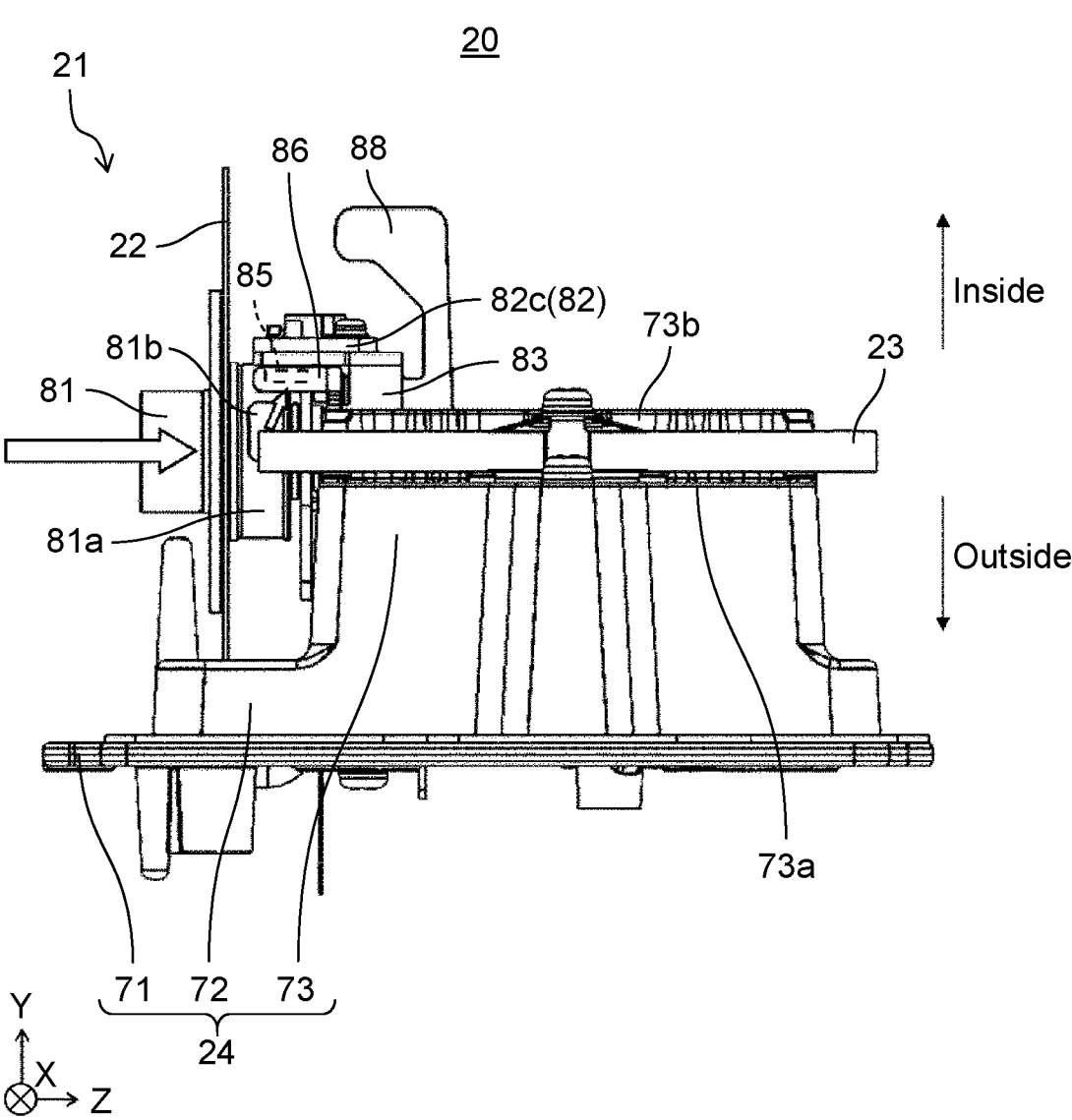
FIG. 4 is a side view of the color wheel unit.
Figure 5:
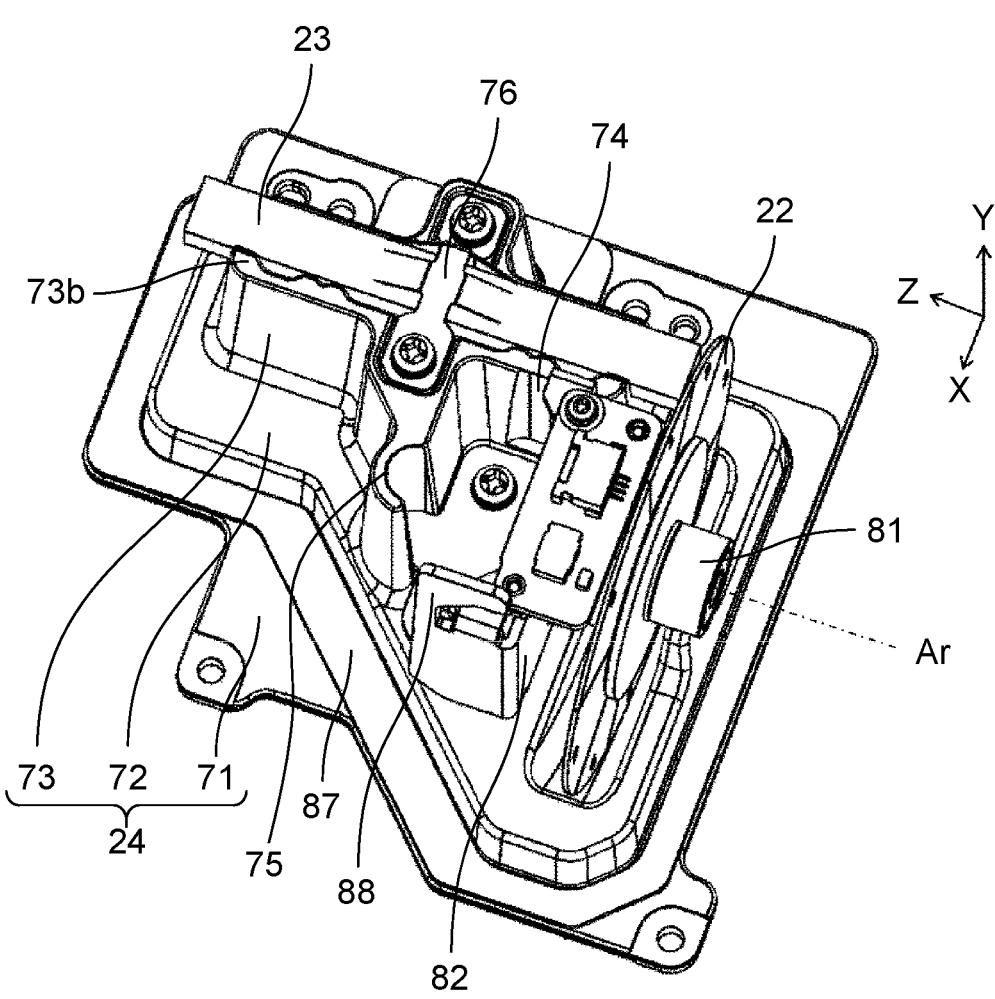
FIG. 5 is an outer appearance perspective view of the color wheel unit.
Figure 6:
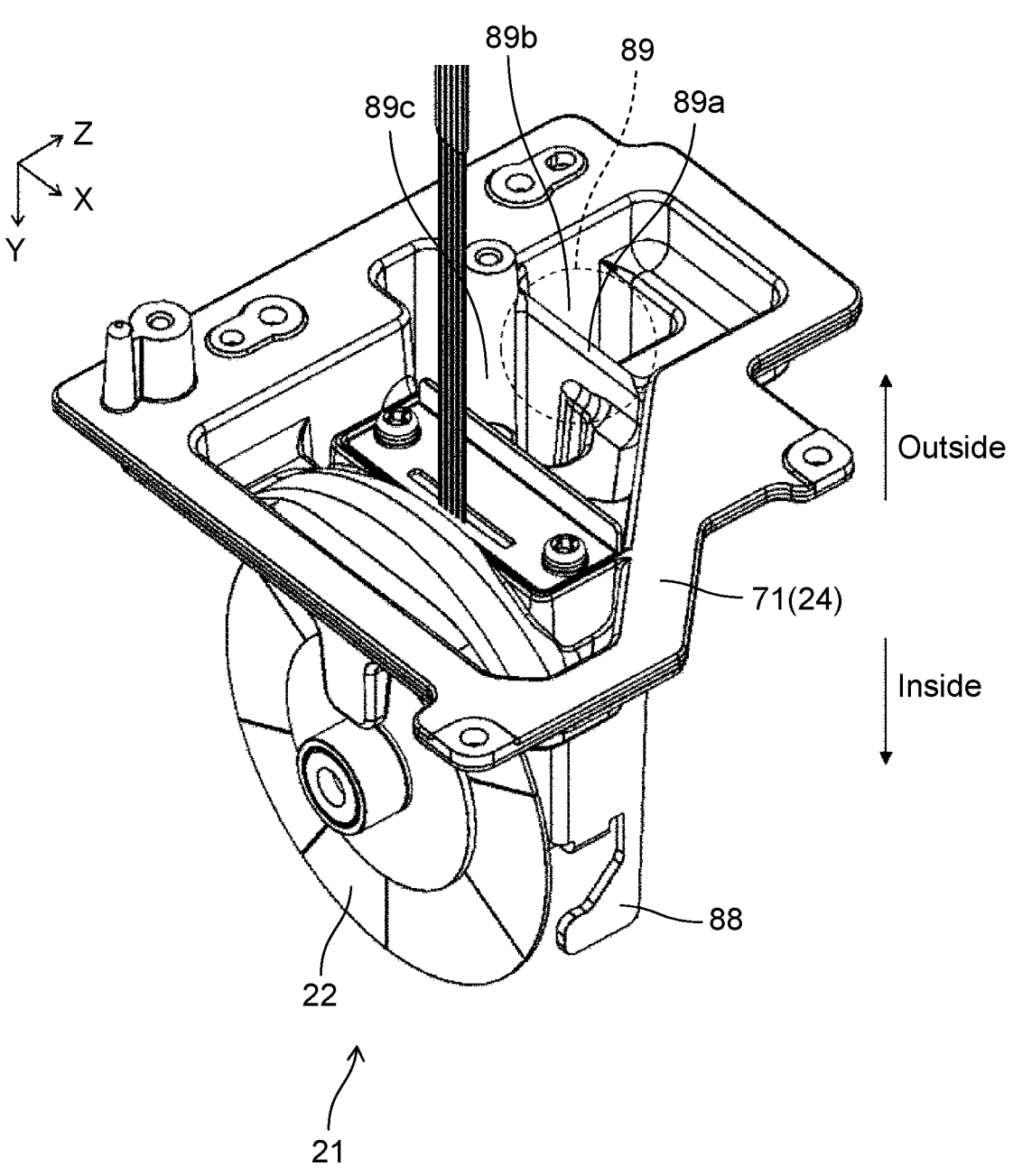
FIG. 6 is an outer appearance perspective view of the color wheel unit.

Hereinafter, color wheel unit 20 according to the first exemplary embodiment will be described with reference to FIGS. 2 to 6. FIG. 2 is an outer appearance perspective view of color wheel unit 20. FIG. 3 is a bottom view of color wheel unit 20. FIG. 4 is a side view of color wheel unit 20. FIGS. 5 and 6 are outer appearance perspective views of the color wheel unit. Note that in each drawing, a plane on which color wheel 22 receives light is an XY plane, and a direction orthogonal to the XY plane is a Z-direction.

Figure 7:
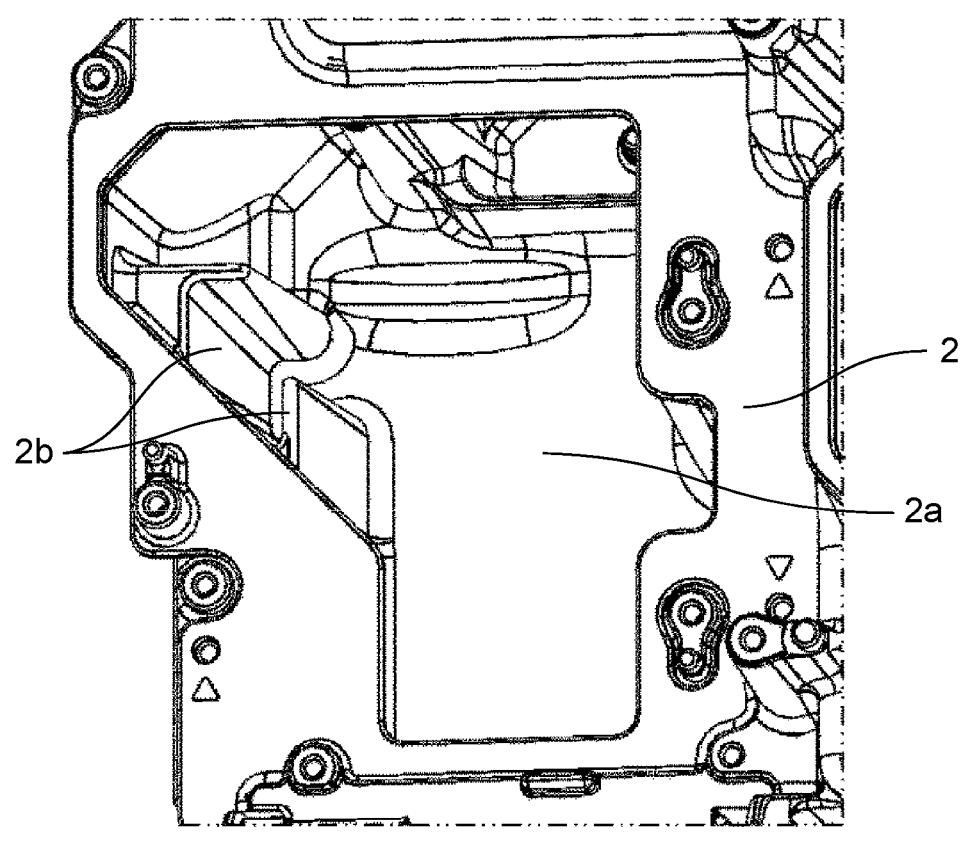
FIG. 7 is a partial perspective view of a housing of the projection display apparatus.
Figure 8:
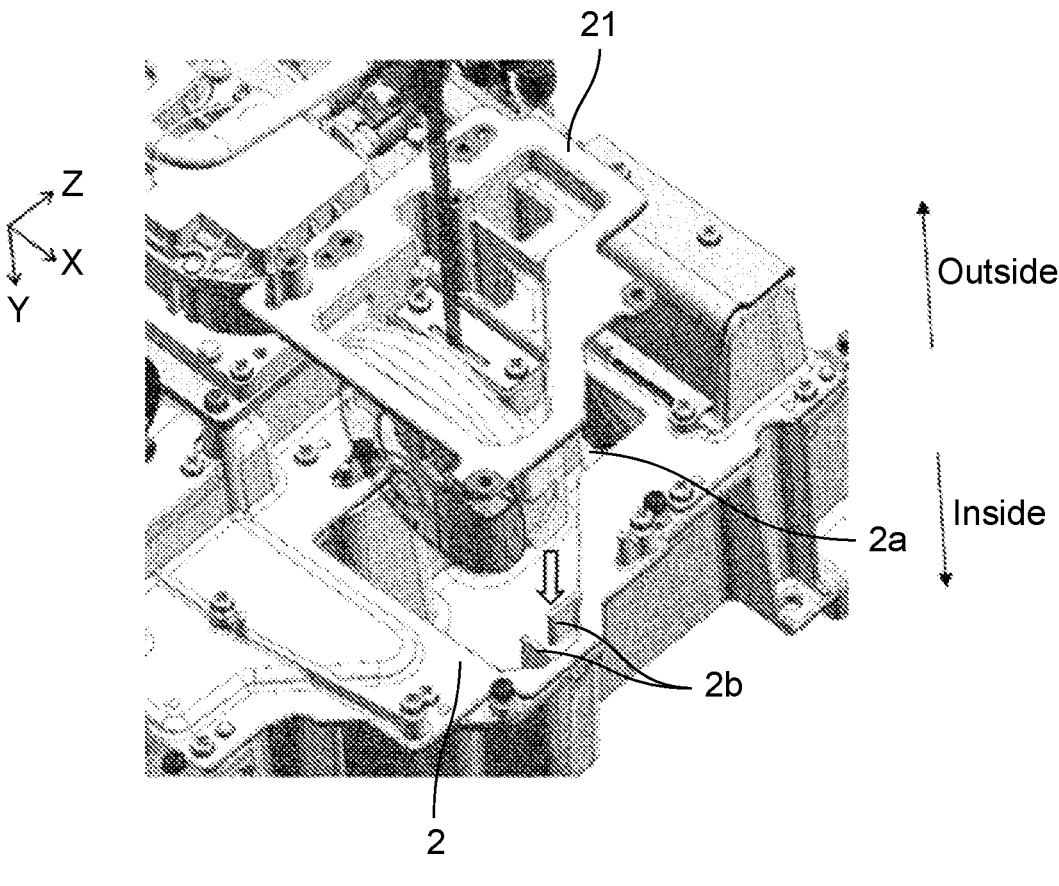
FIG. 8 is a perspective view for explaining attachment of the color wheel unit to the housing.

Color wheel unit 20 includes color wheel assembly 21 having color wheel 22, rod integrator 23 on which light passing through color wheel 22 is incident, and holder 24 to which color wheel assembly 21 and rod integrator 23 are attached. As illustrated in FIG. 7 or FIG. 8, color wheel unit 20 is attached to housing 2 as a lid of opening 2a so that color wheel assembly 21 and rod integrator 23 are accommodated in housing 2 from opening 2a formed in housing 2 of projection display apparatus 1.

Holder 24 is made of metal, and is formed by, for example, die-casting aluminum. Holder 24 includes first base 71 attached to housing 2 of projection display apparatus 1, second base 72 protruding from first base 71 to one side, that is, to an inside of housing 2 to which holder 24 is attached, and third base 73 further protruding from second base 72 to one side and to which rod integrator 23 is attached.

Third base 73 has a trapezoidal shape having a two-stage configuration at an upper part. Third base 73 includes planar placement part 73a on which one surface of rod integrator 23 is placed, and first wall part 73b rising from placement part 73a. A wall surface of first wall part 73b on a side of color wheel 22 is erected from second base 72. A side surface of rod integrator 23 abuts on a part of a side surface of first wall part 73b on a side opposite to color wheel 22. Rod integrator 23 is pressed against placement part 73a and first wall part 73b, and is fixed to third base 73 by fastener 76.

Third base 73 includes first guide wall 74 and second guide wall 75 that guide color wheel assembly 21 when color wheel assembly 21 is attached to holder 24. First guide wall 74 is formed on first wall part 73b on a side of rotation shaft Ar of motor 81 of color wheel 22. First guide wall 74 is a surface in which a part of first wall part 73b, which is mostly an inclined surface, on the side of rotation shaft Ar is formed as a vertical surface.

Second guide wall 75 is formed in second wall part 73c in which third base 73 extends toward color wheel 22. The second guide wall has a semi-cylindrical shape and restricts movement in an X-direction and the Z-direction.

Color wheel assembly 21 includes motor 81 that is coupled to color wheel 22 and rotationally drives color wheel 22, and support part 82 that rotatably supports color wheel 22. Color wheel 22 is integrated with motor 81, and support part 82 supports color wheel 22 by supporting rotation shaft 81a of motor 81.

Support part 82 includes bottom surface 82a attached to second base 72, wall part 82b standing upright from bottom surface 82a, and upper surface 82c extending parallel to bottom surface 82a from wall part 82b. When color wheel assembly 21 is attached to holder 24, support part 82 includes first restricting part 83 whose movement is restricted and guided by first guide wall 74, and second restricting part 84 whose movement is restricted and guided by second guide wall 75.

First restricting part 83 is, for example, an inverted L-shaped flat plate, and first guide wall 74 is a parallel plane facing first restricting part 83. Therefore, the movement of color wheel assembly 21 in a negative direction of an X axis can be restricted by pressing first restricting part 83 against first guide wall 74.

Second restricting part 84 has a convex shape, for example, a semicircular shape. Since second guide wall 75 has a concave shape fitted with second restricting part 84, second restricting part 84 is fitted with second guide wall 75, so that color wheel assembly 21 can be restricted from moving in an X-axis direction and a positive direction of a Z-axis.

As described above, since color wheel assembly 21 is appropriately guided to holder 24 by the combination of first guide wall 74 and first restricting part 83 and the combination of second guide wall 75 and second restricting part 84, it is possible to prevent color wheel 22 and rod integrator 23 from coming into contact with each other. Therefore, when color wheel assembly 21 is attached to holder 24, it is possible to prevent color wheel 22 from being damaged by contact.

Color wheel assembly 21 includes sensor 85 that detects a rotation phase of motor 81. Sensor 85 is attached to upper surface 82c of support part 82 on a side of motor 81. Sensor 85 is, for example, a reflective optical sensor, and irradiates rotation shaft 81a of motor 81 with infrared light from sensor 85 and detects light reflected by rotation shaft 81a. A black marker seal 81b is attached to the rotation shaft 81a of motor 81. Sensor 85 can detect the rotation phase of motor 81 by detecting the reflected light as an ON signal with respect to a part on rotation shaft 81a to which marker seal 81b is not attached, and detecting the reflected light as an OFF signal since it is not possible to detect the reflected light with respect to a part to which marker seal 81b is attached. A detection signal detected by sensor 85 is transmitted to controller 7.

Support part 82 includes light shielding wall 86 between rod integrator 23 and sensor 85 below upper surface 82c. Due to light shielding wall 86, even if the incident light is scattered at an end part of rod integrator 23 on a side of color wheel 22, an amount of the scattered light incident on sensor 85 can be reduced, and erroneous detection of sensor 85 can be reduced.

Light shielding wall 86 may be disposed not only on a side of rod integrator 23 of support part 82 but also on an opposite side thereof to further reduce incidence of scattered light on sensor 85.

Color wheel assembly 21 has a dustproof lid function of reducing entry of dust from opening 2a of housing 2 when attached to housing 2 of projection display apparatus 1. In color wheel 22, dust-proof sheet 87 is disposed inside first base 71 of holder 24 so as to surround second base 72. Sheet 87 is, for example, a sponge. As a result, since color wheel assembly 21 is attached to housing 2 via sheet 87, it is possible to reduce dust from entering housing 2 through a gap between color wheel assembly 21 and housing 2.

When color wheel assembly 21 is attached to housing 2 of projection display apparatus 1, guide piece 88 is inserted into guide part 2b (see FIG. 7) formed in housing 2 of projection display apparatus 1. Guide piece 88 is a metal piece extending from a side opposite to rod integrator 23 of wall part 82b of support part 82 to a side opposite to color wheel 22.

Figure 9:
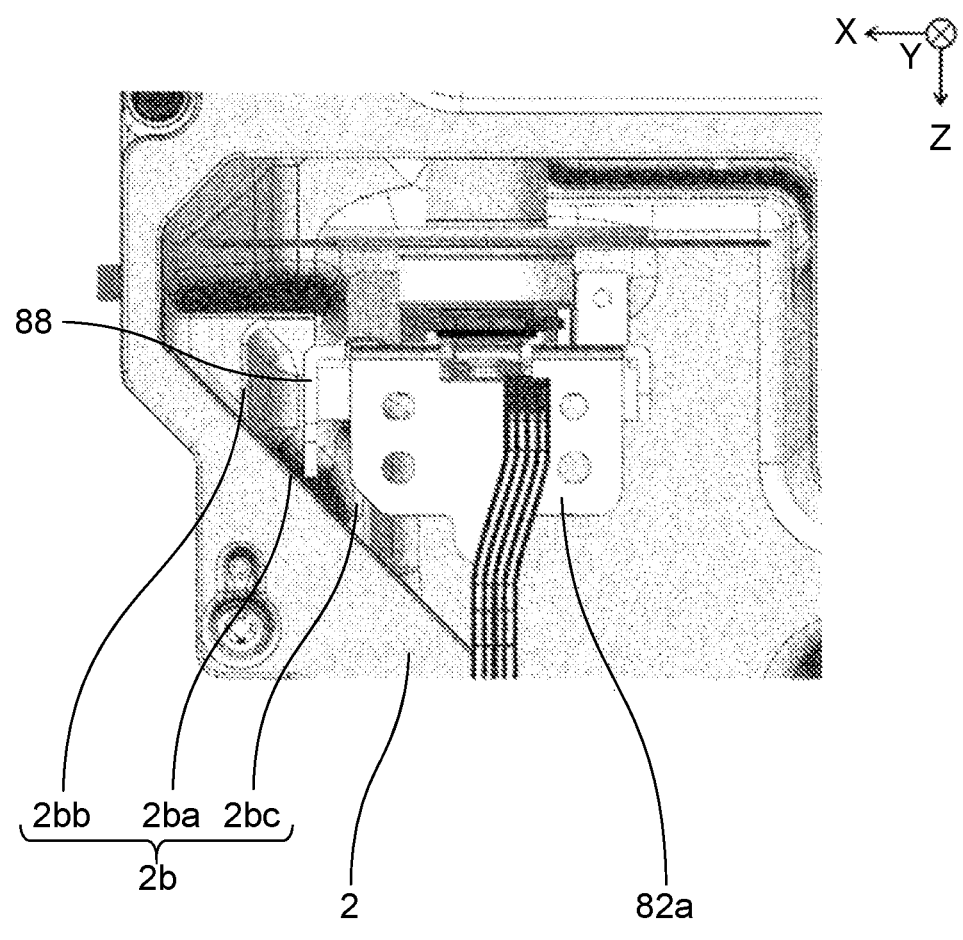
FIG. 9 is an explanatory view illustrating a state in which the color wheel unit is attached to the housing.

As illustrated in FIGS. 8 and 9, when guide piece 88 is inserted into guide part 2b of housing 2, the movement of color wheel assembly 21 in the X-axis direction and the Z-axis direction is restricted, and end parts of color wheel 22 and rod integrator 23 can be prevented from coming into contact with housing 2 and being damaged. Guide part 2b of housing 2 is formed by inner side surface 2ba of housing 2 and two wall parts 2bb, 2bc extending from housing 2. An inner side surface of wall part 2bb has an inverted L shape, inner side surface 2ba of housing 2 and one surface of wall part 2bb face each other, and the other surface of wall part 2bb and wall part 2bc face each other. Guide piece 88 is guided to a space surrounded by inner side surface 2ba, wall part 2bb, and wall part 2bc. The movement of guide piece 88 in the Z-direction is restricted by inner side surface 2ba of housing 2 and one surface of wall part 2bb, and the movement of guide piece 88 in the X-direction is restricted by the other surface of wall part 2bb and wall part 2bc.

As illustrated in FIG. 6, grip part 89 is formed outside color wheel assembly 21 so as to be easily held by a user when color wheel assembly 21 is attached to housing 2 of projection display apparatus 1. The user can easily attach color wheel assembly 21 to housing 2 by gripping grip part 89, so that the assemblability can be improved. Inside third base 73, wall part 89*a* and two spaces 89*b*, 89*c* are formed with wall part 89*a* interposed therebetween, and wall part 89*a* and spaces 89*b*, 89*c* constitute grip part 89.

1-3. Effects and the Like

As described above, in the first exemplary embodiment, color wheel unit 20 includes color wheel assembly 21 having color wheel 22, rod integrator 23 where light having passed through color wheel 22 is incident, and holder 24 to which color wheel assembly 21 and rod integrator 23 are attached. Holder 24 includes first base 71 attached to housing 2 of projection display apparatus 1, second base 72 protruding from first base 71, and third base 73 further protruding from second base 72 and to which rod integrator 23 is attached. Third base 73 includes first guide wall 74 and second guide wall 75 that guide when color wheel assembly 21 is attached to holder 24. Color wheel assembly 21 includes motor 81 that is coupled to color wheel 22 and rotationally drives color wheel 22, and support part 82 that rotatably supports color wheel 22. Support part 82 includes first restricting part 83 whose movement is restricted and guided by first guide wall 74, and second restricting part 84 whose movement is restricted and guided by second guide wall 75 when color wheel assembly 21 is attached to holder 24.

With such a configuration, when color wheel assembly 21 is attached to holder 24, by having the two guide walls, it is possible to prevent contact between color wheel 22 and rod integrator 23 and to reduce a risk of damaging each of them. Further, since color wheel unit 20 integrates color wheel 22 and rod integrator 23 which are frequently replaced, maintainability can be improved.

1-4. Configuration of Phosphor Wheel

Figure 10:
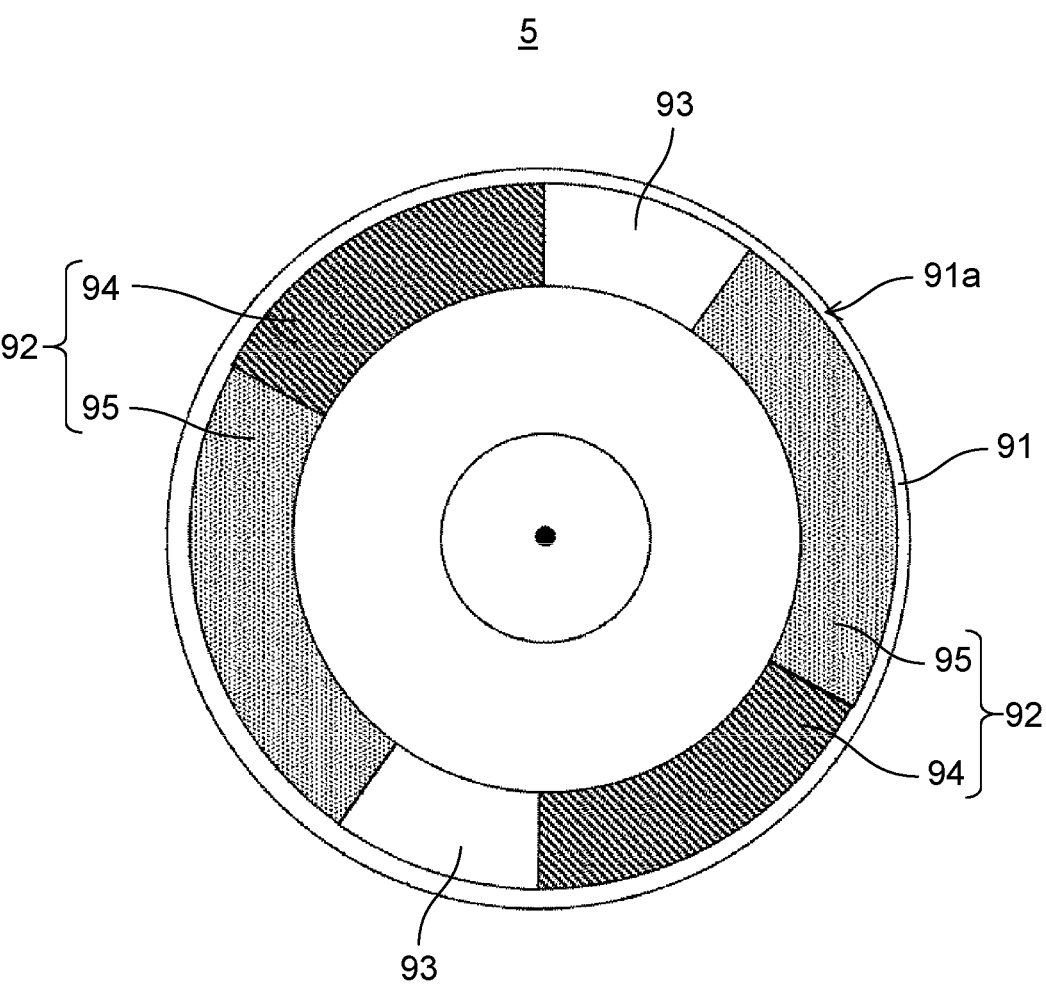
FIG. 10 is a front view of a phosphor wheel.

Next, an arrangement of phosphor segments of the phosphor wheel will be further described with reference to FIG. 10. FIG. 10 is a front view of the phosphor wheel.

In phosphor wheel 5, for example, annular wavelength conversion element 92 is disposed on annular region 91*a* of metal substrate 91, and passing region 93 through which light passes is provided in a partial region of annular region 91*a*. An opening is formed in passing region 93 of substrate 91. As described above, phosphor wheel 5 includes wavelength conversion element 92 having a segment shape.

Wavelength conversion element 92 includes first phosphor segment 94 that wavelength-converts the incident blue excitation light into green fluorescent light and emits the green fluorescent light, and second phosphor segment 95 that wavelength-converts the incident blue excitation light into yellow fluorescent light and emits the yellow fluorescent light.

1-5. Configuration of Color Wheel

Figure 11:
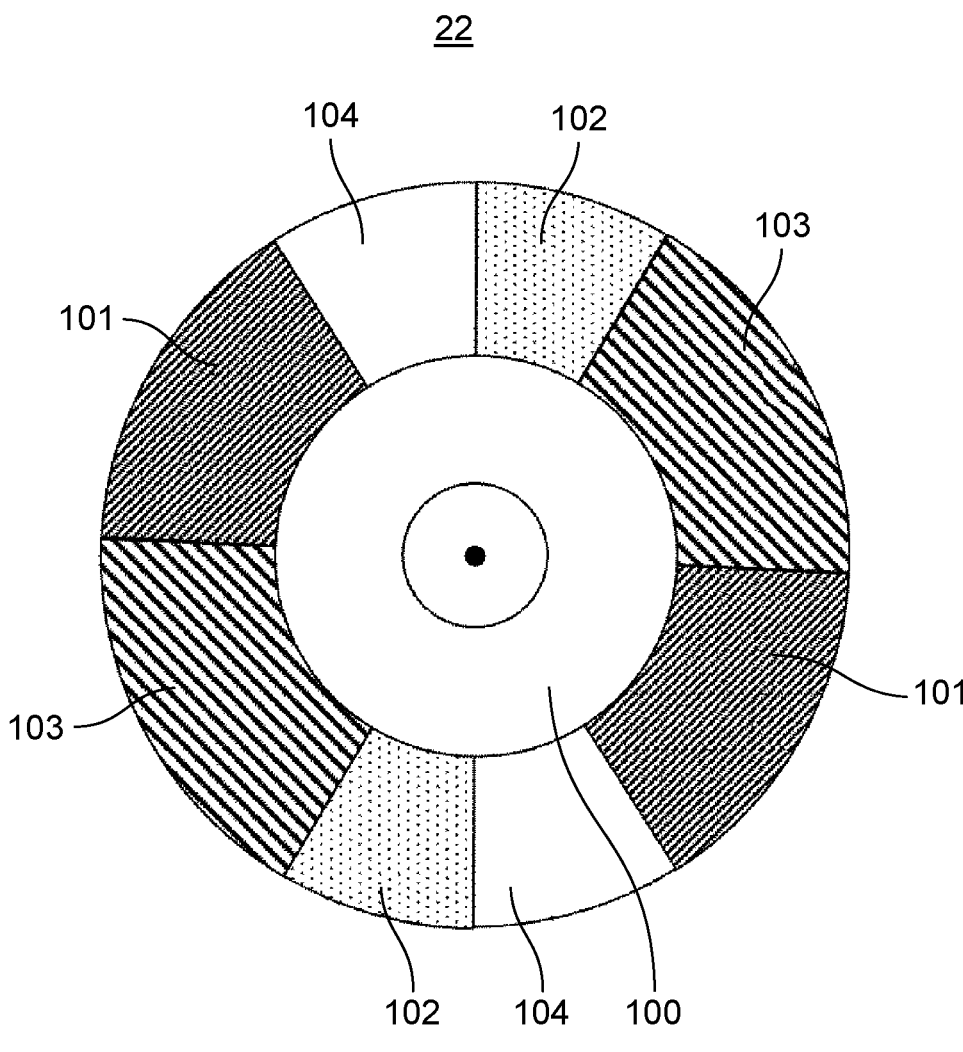
FIG. 11 is a front view of a color wheel.

Next, an arrangement of filters of the color wheel 22 will be further described with reference to FIG. 11. FIG. 11 is a front view of the color wheel 22.

Color wheel 22 includes substrate 100, first segment 101, second segment 102, third segment 103, and fourth segment

104. First segment 101, second segment 102, third segment 103, and fourth segment 104 are each formed by subjecting a surface of a fan-shaped glass plate to a predetermined optical treatment, and are arranged in an annular shape in order from an outer periphery of substrate 100 to an outside. Disk-shaped substrate 100 is made of metal and is also called a counterbalance, and is made of, for example, aluminum. Fan-shaped first to fourth segments 101 to 104 are bonded to a back surface of substrate 100 with an adhesive.

First segment 101 transmits green fluorescent light and yellow fluorescent light from phosphor wheel 5. First segment 101 is subjected to, for example, processing of cutting blue light so as not to transmit blue light, and for example, a blue-cut dichroic film is formed.

Second segment 102 transmits yellow fluorescent light as red light when the yellow fluorescent light is incident, and transmits blue excitation light as blue light when the blue excitation light is incident. In the second segment, for example, a magenta filter is attached to substrate 100.

Third segment 103 transmits yellow fluorescent light as red light when the yellow fluorescent light is incident. In the third segment, for example, a red filter is attached to substrate 100.

Fourth segment 104 is glass having total wavelength transmission and is provided with an antireflection film. Therefore, light incident on fourth segment 104 passes through the fourth segment as it is.

1-6. Rotation Control by Controller

Controller 7 controls rotational phase positions of phosphor wheel 5 and color wheel 22 in one of two rotation modes of a first rotation mode and a second rotation mode as a rotational phase position of color wheel 22 with respect to phosphor wheel 5. The first rotation mode is a mode in which brightness of light emitted from color wheel 22 is prioritized. The second rotation mode is a mode in which priority is given to chromaticity and color luminance of light emitted from color wheel 22.

Figure 12:
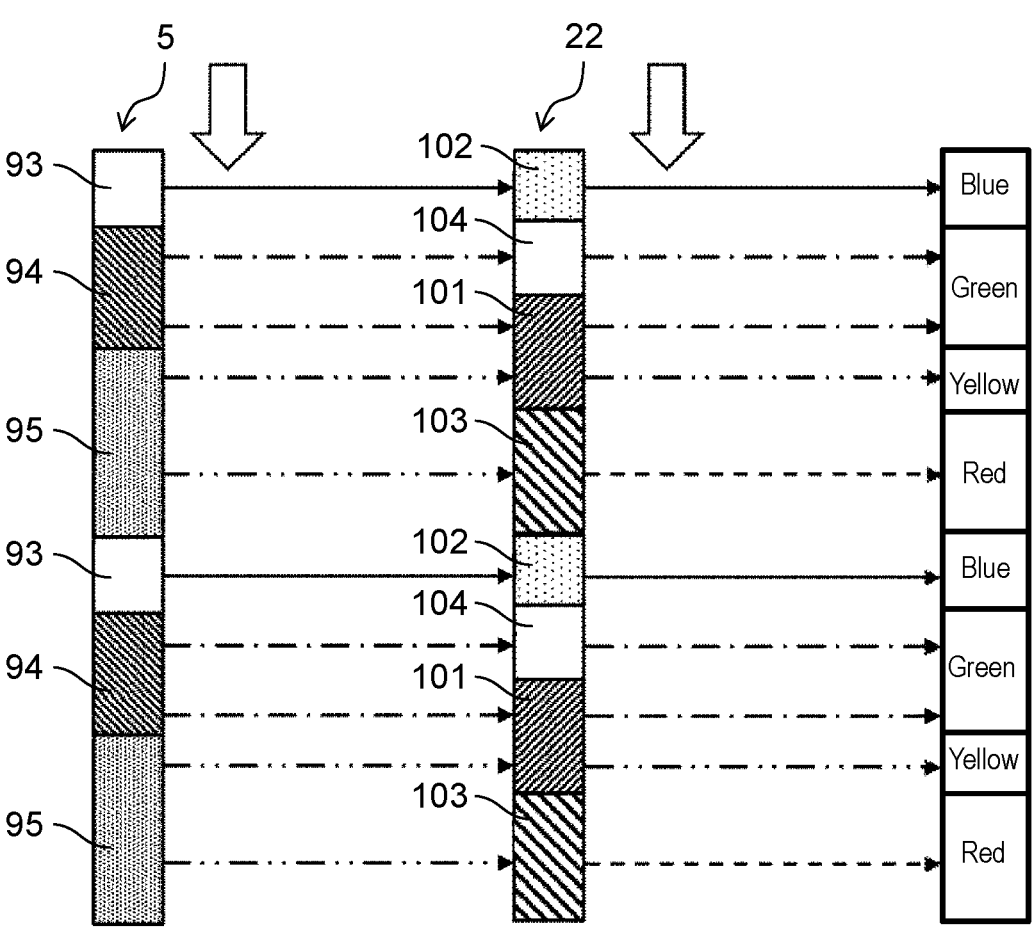
FIG. 12 is an explanatory view for explaining a first rotation mode.

The first rotation mode will be described with reference to FIG. 12. FIG. 12 is an explanatory diagram for explaining the first rotation mode. In the first rotation mode, the blue excitation light emitted from passing region 93 of phosphor wheel 5 is incident on second segment 102 of color wheel 22, and is emitted from color wheel 22 as blue light. Next, phosphor wheel 5 and color wheel 22 rotate in a synchronized state, and the segment illuminated with the blue excitation light changes. The green fluorescent light excited by the excitation light and emitted from first phosphor segment 94 of phosphor wheel 5 is partially incident on fourth segment 104 of color wheel 22 and emitted from color wheel 22 as green light, and then the remaining green fluorescent light is incident on first segment 101 of color wheel 22 and emitted from color wheel 22 as green light.

Next, phosphor wheel 5 and color wheel 22 rotate in a further synchronized state. The yellow fluorescent light excited by the excitation light and emitted from second phosphor segment 95 of phosphor wheel 5 is partially incident on first segment 101 of color wheel 22 and emitted from color wheel 22 as yellow light, and then the remaining yellow fluorescent light is incident on third segment 103 of color wheel 22 and emitted from color wheel 22 as red light.

Since such conversion of light is performed every half rotation of phosphor wheel 5 and color wheel 22, when phosphor wheel 5 and color wheel 22 each rotate once, two sequences of time-division color light can be obtained.

In the first rotation mode, in first segment 101 of color wheel 22, a ratio between an amount of green fluorescent light emitted from first phosphor segment 94 of phosphor wheel 5 and transmitted and an amount of yellow fluorescent light emitted from second phosphor segment 95 and transmitted is a predetermined first ratio. The first ratio is, for example, 55% for green fluorescent light and 45% for yellow fluorescent light, and in the first rotation mode, the rotation phase of color wheel 22 is controlled such that first segment 101 transmits both the green fluorescent light and the yellow fluorescent light. As described above, as a proportion of the color light emitted from color wheel 22, since the proportion of the red light is smaller than that in the second rotation mode to be described later and the yellow light is emitted accordingly, it is possible to secure more yellow of a complementary color and to improve the brightness. Further, in the yellow light, since the blue light included in the yellow fluorescent light emitted from phosphor wheel 5 is cut in first segment 101, purity of yellow can be improved. Here, the blue light included in the yellow fluorescent light means unconverted excitation light that is emitted by being reflected by the phosphor wheel without being wavelength-converted into yellow fluorescent light because blue excitation light is not absorbed by the phosphor.

Figure 13:
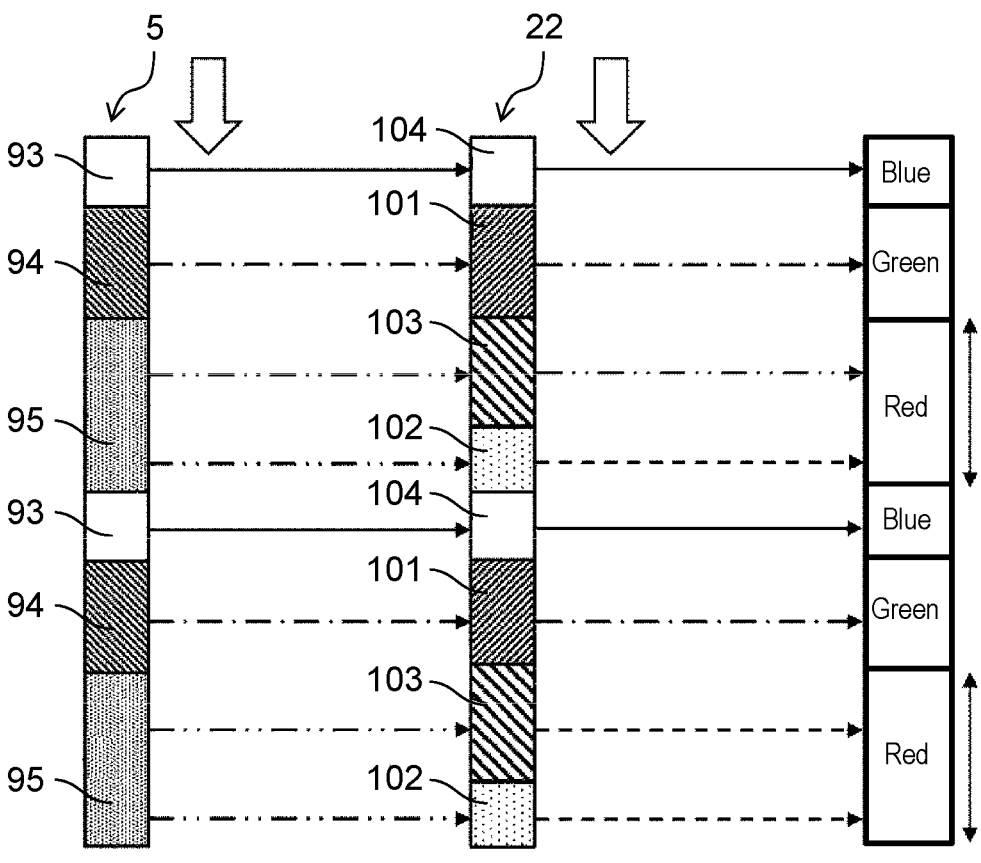
FIG. 13 is an explanatory view for explaining a second rotation mode.

Next, the second rotation mode will be described with reference to FIG. 13. FIG. 13 is an explanatory diagram for explaining the second rotation mode. In the second rotation mode, the rotation phase of color wheel 22 with respect to phosphor wheel 5 in the first rotation mode is changed as illustrated in FIG. 13.

In the second rotation mode, the blue excitation light emitted from passing region 93 of phosphor wheel 5 is incident on fourth segment 104 of color wheel 22, and is emitted from color wheel 22 as blue light. Next, when phosphor wheel 5 and color wheel 22 rotate in a synchronized state, green fluorescent light excited by the excitation light and emitted from first phosphor segment 94 of phosphor wheel 5 is incident on first segment 101 of color wheel 22, and is emitted from color wheel 22 as green light.

Next, when phosphor wheel 5 and color wheel 22 are rotated in a further synchronized state, a part of the yellow fluorescent light excited by the excitation light and emitted from second phosphor segment 95 of phosphor wheel 5 is incident on third segment 103 of color wheel 22 and emitted from color wheel 22 as red light, and the remaining yellow fluorescent light is incident on second segment 102 of color wheel 22 and emitted from color wheel 22 as red light.

In the second rotation mode, similarly to the first rotation mode, such light conversion is performed every half rotation of each of phosphor wheel 5 and color wheel 22. Therefore, when each of phosphor wheel 5 and color wheel 22 makes one rotation, two sequences of time-division color light can be obtained. Thus, color breaking can be reduced.

In the second rotation mode, in first segment 101 of color wheel 22, the ratio between an amount of green fluorescent light emitted from first phosphor segment 94 of phosphor wheel 5 and transmitted and an amount of yellow fluorescent light emitted from second phosphor segment 95 and transmitted is a predetermined second ratio different from the first ratio, and the second ratio is, for example, 100% for green fluorescent light and 0% for yellow fluorescent light. That is, in the second rotation mode in the present exemplary embodiment, the rotation phases of the phosphor wheel and color wheel 22 are controlled such that first segment 101 of color wheel 22 transmits only the green fluorescent light. As described above, as a proportion of the color light emitted from color wheel 22, the yellow light is not emitted as compared with the first rotation mode, and the proportion of the red light is increased accordingly. Therefore, a large amount of red light can be secured, and the color luminance of light can be improved. As a result, it is possible to project a vibrant red image with good red color development. Further, in green light, since blue light which is unconverted excitation light included in the green fluorescent light emitted from phosphor wheel 5 is cut by first segment 101, purity of green can be improved. Note that in the above description, the second ratio is 100% for the green fluorescent light and 0% for the yellow fluorescent light. However, the second ratio is not limited to this, and may be set to an optimum ratio that increases the proportion of the red light, and may be set to a ratio slightly larger than 0% for the yellow fluorescent light, for example, 1%.

Figure 14:
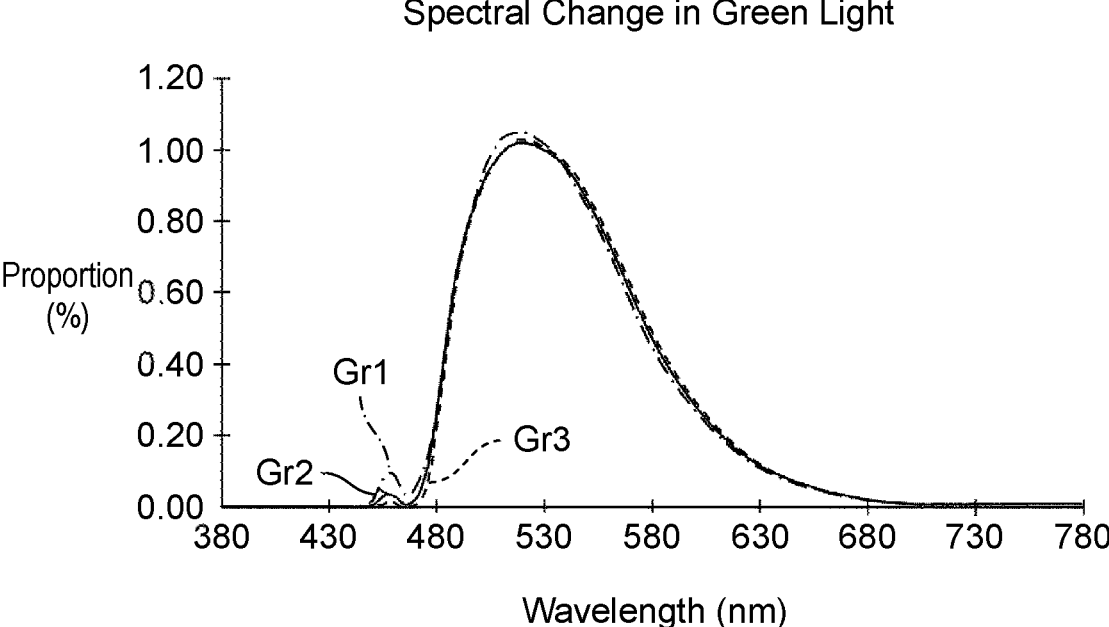
FIG. 14 is a graph illustrating a spectral change in green light.

FIG. 14 is a graph illustrating a spectral change in green light. Graph Gr1 is a graph illustrating a spectral change of conventional green light emitted from color wheel 22. Graph Gr2 is a graph illustrating a spectral change of green light in the first rotation mode of the present exemplary embodiment. Graph Gr3 is a graph illustrating a spectral change of green light in the second rotation mode of the present exemplary embodiment.

As illustrated in FIG. 14, in the green light generated in the first rotation mode and the second rotation mode, a spectral component of the blue light is reduced as compared with the related art, and purity of green can be improved.

Figure 15:
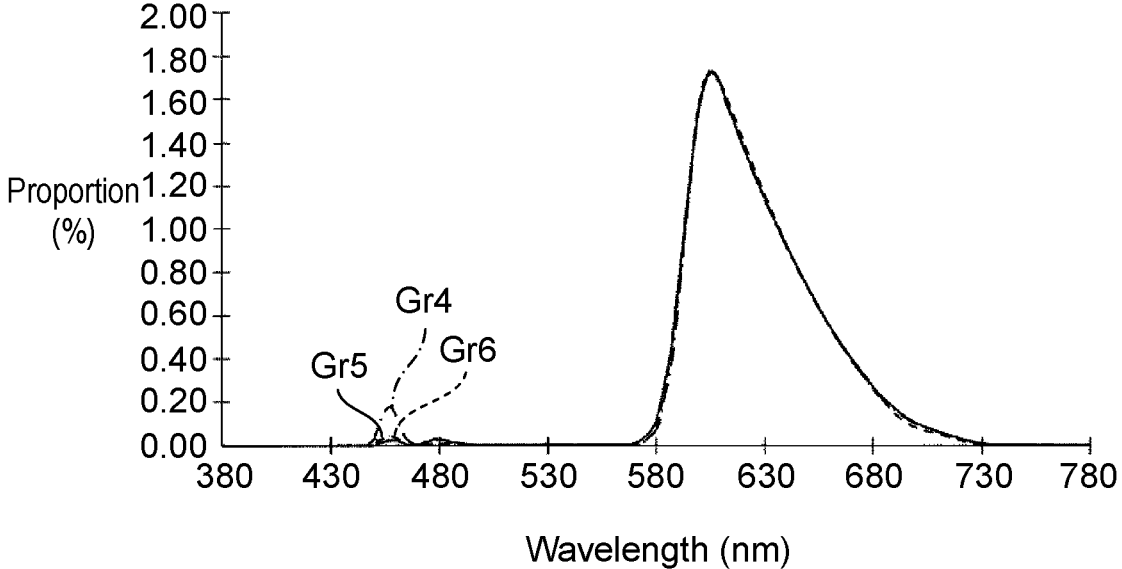
FIG. 15 is a graph illustrating a spectral change in red light.

FIG. 15 is a graph illustrating a spectral change in red light. Graph Gr4 is a graph illustrating a spectral change of conventional red light emitted from color wheel 22. Graph Gr5 is a graph illustrating a spectral change of red light in the first rotation mode of the present exemplary embodiment. Graph Gr6 is a graph illustrating a spectral change of red light in the second rotation mode of the present exemplary embodiment.

As illustrated in FIG. 15, in the red light generated in the first rotation mode and the second rotation mode, a spectral component of the blue light is reduced as compared with the related art, and purity of red can be improved.

Figure 16:
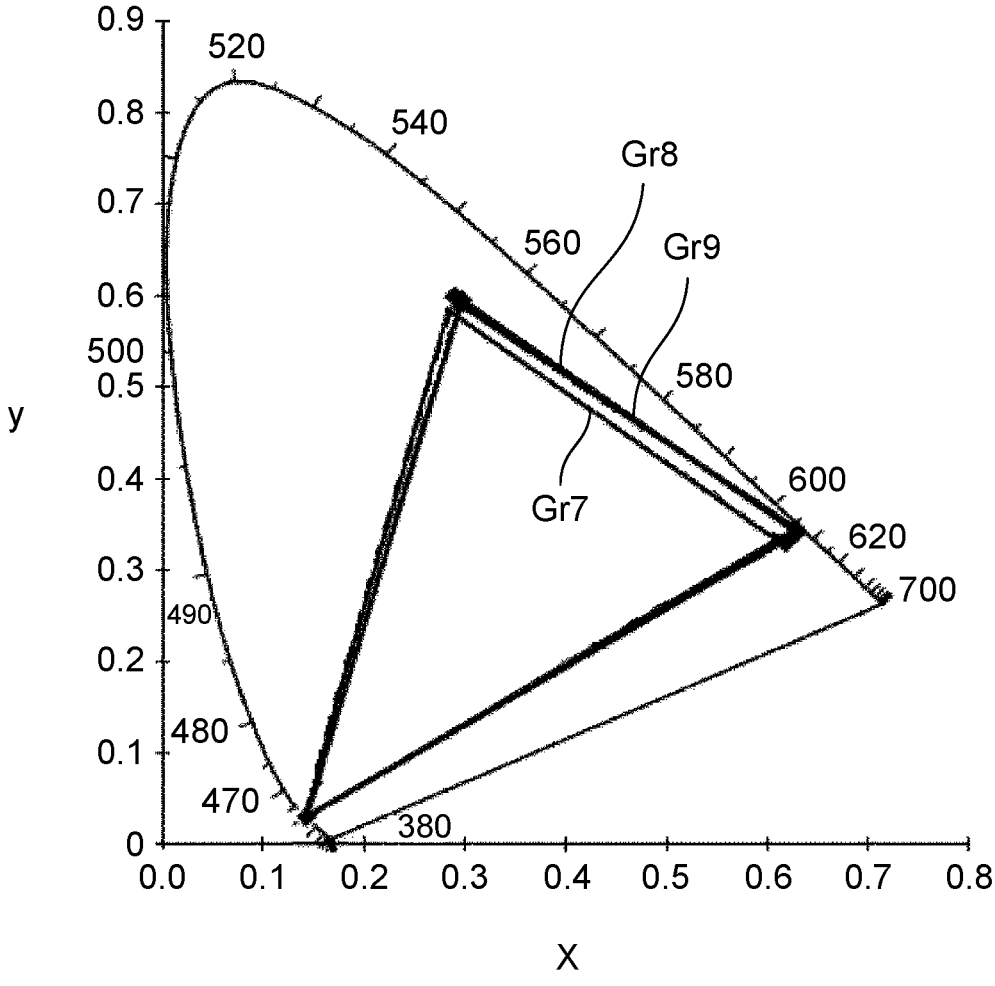
FIG. 16 is a graph illustrating blue, red, and green color gamuts on a CIExy chromaticity diagram.

FIG. 16 is a graph illustrating color gamuts of blue, red, and green in a CIExy chromaticity diagram. Graph Gr7 is a graph illustrating a color gamut of conventional light emitted from color wheel 22. Graph Gr8 is a graph illustrating a color gamut of light in the first rotation mode of the present exemplary embodiment. Graph Gr9 is a graph illustrating a color gamut of light in the second rotation mode of the present exemplary embodiment.

As illustrated in FIG. 16, the color gamuts of the light generated in the first rotation mode and the second rotation mode are wider than the color gamut of the conventional light. The x value of red is improved from 0.636 in the conventional graph Gr7 to 0.650 in the graph Gr8 in the first rotation mode and to 0.651 in the graph Gr9 in the second rotation mode. Further, they value of green is improved from 0.585 in the conventional graph Gr7 to 0.591 in the graph Gr8 in the first rotation mode and to 0.597 in the graph Gr9 in the second rotation mode.

1-7. Effects and Others

As described above, in the first exemplary embodiment, light source device 3 includes phosphor wheel 5, color wheel 22, and controller 7. Phosphor wheel 5 includes first phosphor segment 94 that is excited by blue laser light as excitation light and emits green fluorescent light, second phosphor segment 95 that is excited by blue laser light and emits yellow fluorescent light, and passing region 93 through which blue laser light passes. Color wheel 22 includes first segment 101 capable of transmitting green fluorescent light and yellow fluorescent light from phosphor wheel 5. Controller 7 controls rotational phase positions of phosphor wheel 5 and color wheel 22 in one of two rotation modes of a first rotation mode and a second rotation mode as a rotational phase position of color wheel 22 with respect to phosphor wheel 5. First segment 101 transmits the green fluorescent light and the yellow fluorescent light at a predetermined first ratio in the first rotation mode, and transmits the green fluorescent light and the yellow fluorescent light at a predetermined second ratio different from the first ratio in the second rotation mode. First segment 101 is subjected to processing of cutting blue laser light.

By changing the ratio between the green fluorescent light and the yellow fluorescent light transmitted through first segment 101 according to the rotation modes of phosphor wheel 5 and color wheel 22, priority of brightness and priority of vividness of color can be further improved according to the rotation mode. Further, since the processing of cutting the blue light is performed on first segment 101 through which the green fluorescent light and the yellow fluorescent light are transmitted, the chromaticity of the light transmitted through first segment 101 can be improved.

OTHER EXEMPLARY EMBODIMENTS

As described above, the above exemplary embodiments have been described as examples of the techniques disclosed in the present application. However, the techniques in the present disclosure are not limited to the above exemplary embodiments, and can also be applied to exemplary embodiments in which change, substitution, addition, omission, and the like are performed. Further, a new exemplary embodiment can be made by combining the components described in the above exemplary embodiment.

As described above, the exemplary embodiment has been described to exemplify the techniques in the present disclosure. The accompanying drawings and the detailed description have been presented for this purpose. Accordingly, in order to exemplify the techniques described above, components illustrated or described in the accompanying drawings and the detailed description may not only include components that are essential for solving the problems, but may also include components that are not essential for solving the problems. For this reason, it should not be immediately construed that those non-essential components are essential only based on the fact that those non-essential components are illustrated in the accompanying drawings or described in the detailed description.

Further, the above exemplary embodiment is provided to exemplify the techniques according to the present disclosure. Therefore, it is possible to make various changes, replacements, additions, omissions, and the like, within the scope of the claims and equivalents thereof.

Overview of Exemplary Embodiment (1) A color wheel unit of the present disclosure includes a color wheel assembly having a color wheel, a rod integrator where light having passed through the color wheel is incident, and a holder to which the color wheel assembly and the rod integrator are attached. The holder includes a first base attached to a housing of a projection display apparatus, a second base protruding from the first base, and a third base further protruding from the second base and to which the rod integrator is attached. The third base includes a first guide wall and a second guide wall that guide the color wheel assembly when the color wheel assembly is attached to the holder. The color wheel assembly includes a motor that is coupled to the color wheel and rotationally drives the color wheel, and a support part that rotatably supports the color wheel. The support part includes a first restricting part whose movement is restricted and guided by the first guide wall, and a second restricting part whose movement is restricted and guided by the second guide wall when the color wheel assembly is attached to the holder.

Thus, when the color wheel assembly is attached to the holder, the two guide walls are provided, so that the contact between the color wheel and the rod integrator can be prevented, and a risk of damaging each of the color wheel and the rod integrator can be reduced. Further, since the color wheel unit integrates the color wheel and the rod integrator which are frequently replaced, maintainability can be improved.

(2) In the color wheel unit of (1), the first restricting part is a flat plate, and the first guide wall is a plane parallel to the first restricting part.

(3) In the color wheel unit of (1) or (2), the second restricting part is a convex part, and the second guide wall is a concave part fitted to the second restricting part.

(4) In the color wheel unit according to any one of (1) to (3), the color wheel unit includes a guide piece to be inserted into a guide part formed in the housing of the projection display apparatus.

As a result, since a user only needs to insert the guide piece of the color wheel unit into the guide part of the housing, assemblability can be improved.

(5) In the color wheel unit according to any one of (1) to (4), the holder covers an attachment opening disposed on a side of a predetermined surface of the housing of the projection display apparatus.

(6) In the color wheel unit according to any one of (1) to (5), a handle part that grips the holder is formed on a side opposite to a side where the support part of the holder is attached.

Accordingly, since the user can easily grip the color wheel unit, assemblability can be improved.

(7) In the color wheel unit according to any one of (1) to (6), in the first base, a sheet is disposed at a position corresponding to a periphery of an opening on a side attached to the housing of the projection display apparatus.

As a result, when the color wheel unit is attached to the housing, the holder itself on which the sheet is disposed can function as a dustproof lid.

(8) In the color wheel unit according to any one of (1) to (7), the color wheel assembly includes a sensor that detects a rotation phase of the motor. The support part includes a light shielding wall between the rod integrator and the sensor.

As a result, scattered light can be reduced from entering the sensor by the light shielding wall, and erroneous detection of the sensor can be reduced.

(9) A projection display apparatus of the present disclosure includes any one of the color wheel units (1) to (8).

Further, when a light amount of excitation light increases, a light amount of the color of the excitation light increases more than a light amount of other colors, and there is also a problem that a color gamut of projection light is narrowed.

Therefore, an object of the present disclosure is to provide a light source device and a projection display apparatus capable of widening a color gamut.

(10) A light source device of the present disclosure includes: a phosphor wheel including a first phosphor segment that is excited by first color light that is excitation light and emits second color light that is fluorescent light, a second phosphor segment that is excited by the first color light and emits third color light that is fluorescent light, and a region that makes the first color light pass through; a color wheel including a first segment capable of transmitting the second color light and the third color light from the phosphor wheel; and a controller that controls rotational phase positions of the phosphor wheel and the color wheel in one of two rotation modes of a first rotation mode and a second rotation mode as a rotational phase position of the color wheel with respect to the phosphor wheel. The first segment transmits the second color light and the third color light at a predetermined first ratio in the first rotation mode, and transmits the second color light and the third color light at a predetermined second ratio different from the first ratio in the second rotation mode. The first segment is subjected to processing of cutting the first color light.

By changing the ratio between the green fluorescent light and the yellow fluorescent light transmitted through first segment 101 according to the rotation modes of phosphor wheel 5 and color wheel 22, priority of brightness and priority of vividness of color can be further improved according to the rotation mode. Further, since the processing of cutting blue light is applied to first segment 101 through which the green fluorescent light and the yellow fluorescent light are transmitted, the chromaticity of the light transmitted through first segment 101 can be improved, and the color gamut can be widened.

(11) In the light source device of (10), the first color light that is the excitation light is blue laser light. The first phosphor segment is a green phosphor segment that emits green fluorescent light that is the second color light. The second phosphor segment is a yellow phosphor segment that emits yellow fluorescent light that is the third color light.

(12) A light source device of the present disclosure includes: a phosphor wheel including a first phosphor segment that is excited by blue laser light and emits green fluorescent light, a second phosphor segment that is excited by blue laser light and emits yellow fluorescent light, and a substrate on which the first phosphor segment and the second phosphor segment are disposed; a color wheel including a first segment capable of transmitting the green fluorescent light and the yellow fluorescent light from the phosphor wheel; and a controller that controls rotational phase positions of the phosphor wheel and the color wheel in one of two rotation modes of a first rotation mode and a second rotation mode as a rotational phase position of the color wheel with respect to the phosphor wheel. The controller controls the first segment to transmit both the green fluorescent light and the yellow fluorescent light in the first rotation mode, and to transmit the green fluorescent light in the second rotation mode. The first segment is subjected to processing of cutting the blue laser light.

(13) In the light source device according to any one of (10) to (12), the color wheel includes: a second segment in which a magenta filter is disposed, the second segment transmitting third color light as red light when the third light that is yellow fluorescent light is incident, and transmitting first color light as blue light when the first light that is blue laser light is incident; and a third segment in which a red filter is disposed, the third segment transmitting the third color light as red light when the third color light that is the yellow fluorescent light is incident. A first phosphor segment that is a green phosphor segment, and a second phosphor segment that is a yellow phosphor segment are disposed in the phosphor wheel, the phosphor wheel emitting two sequences of time-division light when circling around once. The first, second, and the third segments are disposed in the color wheel, the color wheel emitting two sequences of time-division light when circling around once.

(14) In the light source device according to (13), the controller controls the second segment to transmit the blue laser light in the first rotation mode, and to transmit the yellow fluorescent light in the second rotation mode in the second segment.

(15) In the light source device of (14), the controller transmits the yellow fluorescent light in the first rotation mode and the second rotation mode in the third segment.

(16) A projection display apparatus of the present disclosure includes any one of light source devices (10) to (15).

The present disclosure is applicable to a phosphor wheel that emits illumination light to wavelength-convert the light, a light source device that uses the light wavelength-converted by the phosphor wheel, and a projection display apparatus.

What is claimed is:

1. A color wheel unit comprising:
a color wheel assembly including a color wheel;
a rod integrator where light having passed through the color wheel is to be incident; and
a holder to which the color wheel assembly and the rod integrator are attached,
wherein the holder includes:
a first base configured to be attached to a housing of a projection display apparatus;
a second base protruding from the first base; and
a third base protruding from the second base and to which the rod integrator is attached,
wherein the third base includes a first guide wall and a second guide wall configured to guide the color wheel assembly in a case that the color wheel assembly is attached to the holder,
wherein the color wheel assembly includes:
a motor coupled to the color wheel and configured to rotationally drive the color wheel;
a support part configured to rotatably support the color wheel; and
a sensor configured to detect a rotation phase of the motor, and
wherein the support part includes: (i) a first restricting part configured to have a movement thereof restricted and guided by the first guide wall; (ii) a second restricting part configured to have a movement thereof restricted and guided by the second guide wall in the case that the color wheel assembly is attached to the holder; and (iii) a light shielding wall between the rod integrator and the sensor.

2. The color wheel unit according to claim 1, wherein:
the first restricting part is a flat plate; and
the first guide wall is a plane parallel to the first restricting part.

3. The color wheel unit according to claim 1, wherein:
the second restricting part is a convex part;
the second guide wall is a concave part fitted to the second restricting part; and
the concave part is recessed in a direction in which light is to be incident on the color wheel.

4. The color wheel unit according to claim 1, further comprising a guide piece configured to be inserted into in a guide part defined in the housing of the projection display apparatus.

5. The color wheel unit according to claim 1, wherein the holder is configured to: (i) be accommodated in an attachment opening on a side of a surface of the housing of the projection display apparatus; and (ii) cover the attachment opening.

6. The color wheel unit according to claim 1, further comprising a handle part configured to grip the holder, the handle part being on a first side opposite to a second side where the support part of the holder is attached.

7. The color wheel unit according to claim 1, wherein, in the first base, a sheet is configured to be disposed at a position corresponding to a periphery of an opening of the housing of the projection display apparatus on a side attached to the housing of the projection display apparatus.

8. A projection display apparatus comprising the color wheel unit according to claim 1.

\* \* \* \* \*